US005550757A

United States Patent [19]

Tervahauta

[11] Patent Number: 5,550,757

[45] Date of Patent: Aug. 27, 1996

[54] METHOD FOR DETERMINATION OF THE POSITION OF AN ELONGATED PIECE

[75] Inventor: Jukka Tervahauta, Tampere, Finland

[73] Assignee: Novatron Oy, Tampere, Finland

[21] Appl. No.: 290,917

[22] PCT Filed: Feb. 18, 1993

[86] PCT No.: PCT/EI93/00056

§ 371 Date: Aug. 22, 1994

§ 102(e) Date: Aug. 22, 1994

[87] PCT Pub. No.: WO93/17301

PCT Pub. Date: Sep. 2, 1993

[30] Foreign Application Priority Data

Feb. 21, 1992 [FI] Finland .................................... 920754

[51] Int. Cl.[6] ........................................ G01C 9/00

[52] U.S. Cl. ........................................ 364/560

[58] Field of Search .................................... 364/560, 508, 364/818, 167.01, 566; 33/1 M, 503, 338, DIG. 21, 366, 391; 73/862.637, 514.15, 514.16, 514.22; 173/1

[56] References Cited

U.S. PATENT DOCUMENTS

| | | | |
|---|---|---|---|
| 3,777,123 | 12/1973 | Games | 364/818 |
| 3,932,855 | 1/1976 | Hamilton | 364/818 |
| 3,938,258 | 2/1976 | Zook | 33/366 |
| 3,974,699 | 8/1976 | Morris et al. | 364/167.01 |
| 4,179,233 | 12/1979 | Bromell et al. | 33/1 M |
| 4,277,895 | 7/1981 | Wiklund | 33/366 |
| 4,910,673 | 3/1990 | Narisawa et al. | 33/328 |
| 5,170,665 | 12/1992 | Janiaud et al. | 73/514.22 |
| 5,383,524 | 1/1995 | Rinnemaa | 173/1 |
| 5,440,492 | 8/1995 | Kozah et al. | 364/559 |

FOREIGN PATENT DOCUMENTS

| | | |
|---|---|---|
| 2072343 | 9/1981 | United Kingdom . |
| 2086055 | 5/1982 | United Kingdom . |
| 2195775 | 4/1988 | United Kingdom . |

*Primary Examiner*—Ellis B. Ramirez
*Attorney, Agent, or Firm*—Pollock, Vande Sande & Priddy

[57] ABSTRACT

The invention relates to a method for determining the position of an elongated piece, particularly its end point (P2). In applying the method, two points (P1,P2) are defined in an elongated piece, the distance (L) therebetween being known. For applying the method, at least one acceleration sensor (2) is placed in connection with the elongated piece (1) for measuring acceleration forces active on the elongated piece in an elected vertical measuring plane passing through two points (P1,P2).

9 Claims, 1 Drawing Sheet

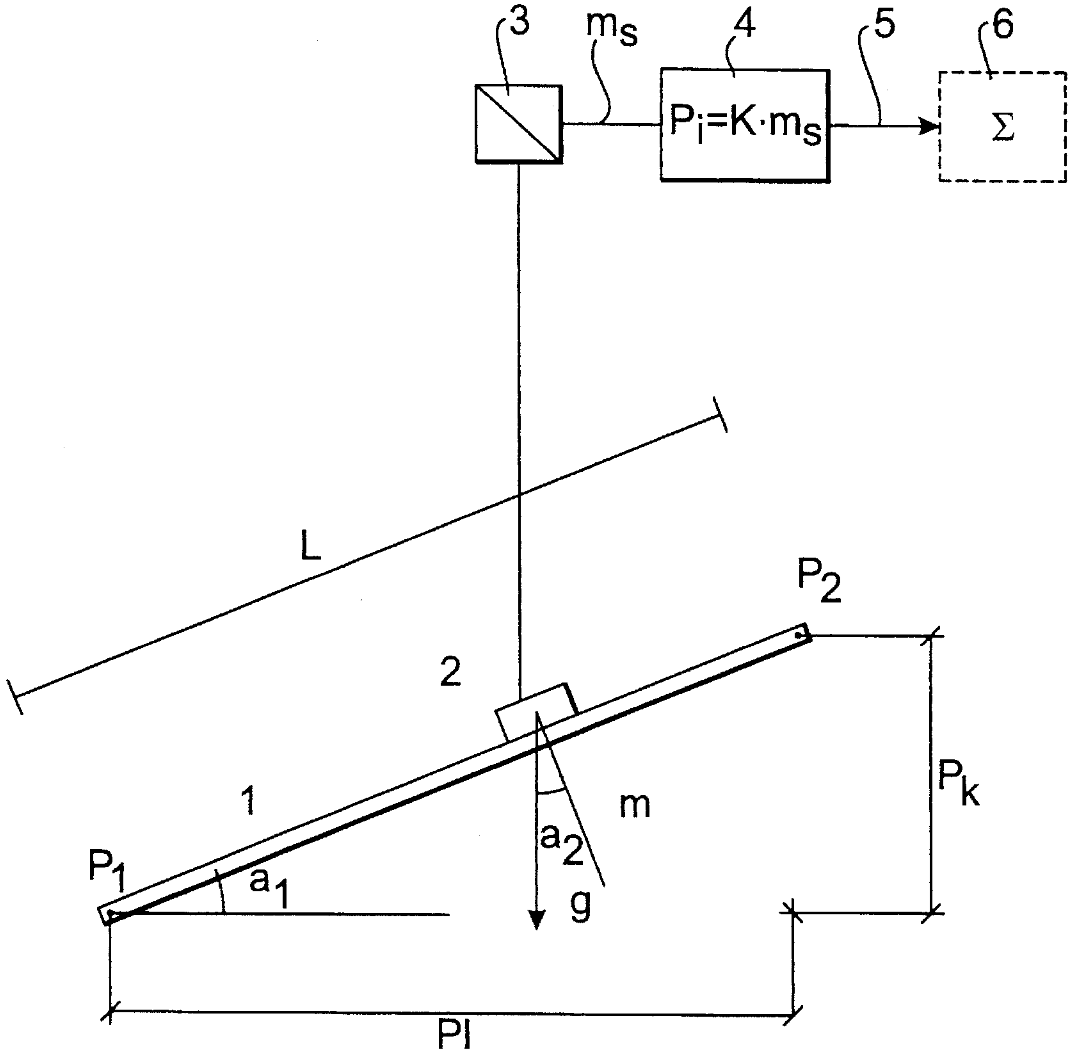
3
$m_s$
4
$P_i=K \cdot m_s$
5
6
Σ
L
$P_2$
2
1
$P_k$
m
$a_2$
$P_1$
$a_1$
g
Pl

METHOD FOR DETERMINATION OF THE POSITION OF AN ELONGATED PIECE

FIELD OF THE INVENTION

The invention relates to a method according to the preamble of claim 1 for determination of the position of an elongated piece. This application is a 371 Application of PCT/F193/00056, filed on Feb. 18, 1993.

BACKGROUND OF THE INVENTION

The method according to the preamble is substantially known from U.S. Pat. No. 3,974,699, disclosing a method for measuring, for example, the position of the blade of a road grader in relation to the horizontal level.

In particular, but not solely, the method of the present invention can be used for measuring the height position or the horizontal extension of a bucket or work platform in connection with the beam structure, or a part thereof, of a working machine, such as an excavator, access platform (lifting apparatus) or the like. At present, the height position or the horizontal extension is measured by using angle detecting sensors mounted at points of articulation of the beam structure, and the position of the beam structure is calculated on basis of the information given thereby. A method of this kind has the disadvantage of a particularly difficult mounting of the angle detecting sensors afterwards on working machines with no equipment ready for measuring the height position and/or the horizontal extension. Another disadvantage is the relative complexity of measurement by angle detecting sensors, because the calculation operations required by the same require microprocessor techniques and calculation algorithms due to the fact that the method is based on trigonometric functions.

SUMMARY OF THE INVENTION

It is an aim of the present invention to provide an improved method for determining the position of an elongated piece, wherein the elongated piece is a beam structure or a part thereof. The method is used for measuring the height position and/or horizontal extension of beam structures or parts thereof. Thus the main object of the invention is to improve the state of art in the field. For achieving this object, the method of the invention is primarily characterized by the following:

—the elongated piece used is the beam structure, or a part thereof, of a working machine, such as an excavator, access platform or the like, which is arranged to be pivotable substantially in the vertical plane around a point of articulation, —in the beam structure or part thereof, two points are determined, whose distance is known, preferably constant, wherein at least one of the points is a point of articulation, —a calculation formula with the following general pattern is input in the computing unit:

$(P_i = K * m_s)$, wherein $P_i$=the desired projection of the distance between the points in the measuring level, K=L/g, wherein L= the distance between the points, and g= gravitational acceleration, and $m_s$=the measuring signal of the acceleration sensor, possibly modified by an analog operator, if required, into a quantity suitable for the computing unit, and —the measuring direction of the acceleration sensor is selected either substantially perpendicular to the direct line between the two points, wherein by using the measuring signal of the measuring sensor, the horizontal extension of the beam structure or a part thereof is provided by the calculation formula $(P_i = K * m_s)$, and/or the measuring direction of the acceleration sensor is selected substantially to merge with the longitudinal direction of the direct line between the two points, wherein by using the measuring signal of the measuring sensor, the height position of the beam structure is provided by the calculation formula $(P_i = K * m_s)$.

The main advantages of the method presented above include the fact that the components required for application of the method can be easily mounted afterwards to a beam structure which is not provided with equipment for measuring the height position and/or horizontal extension or in which the measuring equipment must be replaced. Covered acceleration sensors can be mounted, for example, in excavators onto the part of the beam structure to be measured. The mounting can be performed even by the contractor himself without special tools. Secondly, the data of the height position and/or the horizontal extension is obtained using simple analog electronics. Thus the overall costs of the required equipment for the consumer are reasonable due to the simple electronics. The manufacture of the equipment required for application of the method is inexpensive also.

In working machines, such as excavators, access platforms or the like, the beam structure or a part thereof is arranged to be pivotable substantially in the vertical plane around a point of articulation. A beam structure of this kind may comprise several parts, of which the first is articulated in the frame of the working machine, such as an excavator or a access platform, and of which the others are joined together by articulation in a way that the second part of the beam structure is articulated in the free end of the first part, and the like. It is thus possible to obtain the total height position and/or the total horizontal extension of the beam structure using an application of the method, in which at least one acceleration sensor is placed in connection with each part of the beam structure, by adding together the height positions or the horizontal extensions of separate parts of the beam structure.

As the first point, it is advantageous to select the point of articulation around which the beam structure or part thereof is arranged to pivot substantially in the vertical plane. Another important feature of the application is the fact that the points with a known distance are positioned in a way that the direct line between them is parallel to the longitudinal direction of the beam structure or part thereof. Further, an important feature of the application is the fact that the distance selected between the points is the operational length of the beam structure or part thereof. In this context, the operational length refers to the measurement of the position of the beam structure or part thereof substantially between two points of articulation according to the method. Thus, the first point is the point of articulation between a part of the beam structure and the frame of the working machine, or between the two points in the beam structure. The second point is then the point of articulation between the operational point in connection with the beam structure of the working machine, such as a bucket or working cage of an access platform, or the point of articulation connected to the next part of the beam structure.

The method of the invention can be easily applied by computing in a way that the measuring direction of the acceleration sensor is selected to be either substantially perpendicular to the direct line between the two points or to merge with the longitudinal direction of the direct line between the two points. Thus, by simple calculation as described further on, it is possible to obtain directly from the measuring signal of the measuring sensor in the former case the horizontal extension and in the latter case the height position of the beam structure or the part thereof. Consequently, it is advantageous in at least some applications to arrange two acceleration sensors in each beam structure or part thereof, whose directions of measuring are selected in the manner described above to be, for example, the longitudinal direction of the beam structure and perpendicular to the longitudinal direction, wherein both projections to be obtained by the method can be obtained simultaneously using a simple calculation formula.

The invention relates also to the use of an acceleration sensor as an element for measuring the position of an elongated piece, particularly a beam structure and/or part thereof in connection with a working machine.

BRIEF DESCRIPTION OF THE DRAWINGS

In the following, the invention is described in more detail with reference to the appended drawing which illustrates the measuring method schematically.

With reference to the drawing, an elongated piece, such as a beam structure or part thereof is shown by reference numeral 1. An acceleration sensor 2 is placed in connection with the elongated piece 1. The measuring direction m of the acceleration sensor 2 is selected to be perpendicular to the direct line between the points $p_1$ and $p_2$, and the direction of gravitational acceleration is shown by arrow g. The distance between the points $P_1$ and $P_2$, which is known according to the invention, is shown by the letter L. The height position of the part $P_2$ of the elongated piece 1 is indicated in the drawing by the letter $P_k$ and the horizontal extension of the elongated piece 1 by the letter $P_i$, correspondingly. It must also be noted that particularly in the drawing, the measuring direction m of the acceleration sensor is effective in the same plane as the gravitational acceleration g.

Using the references of the drawing, it can be trigonometrically deduced that the angle $a_1$ between the horizontal level and the direct line between the points $p_1$ and $p_2$ is equal to the angle $a_2$ between the direction of the gravitational acceleration g and the measuring direction of the acceleration sensor 2. In the following, the angles $a_1$ and $a_2$ are indicated by the letter a, for simplicity.

Using the references of the drawing, the cosine of the tilt angle a can be calculated from the measuring signal $m_s$ of the acceleration sensor 2 as follows:

$$m_s g * \cos(a)$$

$$\cos(a) = m_s/g$$

On the other hand, the horizontal extension $P_i = L * \cos(a)$, which results in:

$$P_i = L * (m_s/g) = (L/g) * m_s$$

When L/g is a constant K, it follows that:

$$P_i = K * m_s$$

Consequently, the horizontal extension $P_i$ of the elongated piece 1 can be obtained directly by multiplying the measuring result of the acceleration sensor 2 by the constant K. The measuring signal $m_s$ is transmitted to a computing unit 4, for example, as a voltage signal or possibly as a quantity modified by an analog operator 3 suitable to the computing unit 4.

In a corresponding manner, the height position $P_k$ of the beam structure is obtained by turning the measuring direction m of the acceleration sensor 2 into the longitudinal direction of the elongated piece 1 (parallel to the direction of the direct line between the points $p_1$ and $p_2$), which results in:

$m_s = g * \sin(a)$ height $P_k = L, \sin(a)$, and further $P_k = K * m_s$, where K is a constant.

Consequently, by simple multiplication operations, particularly the height position and/the horizontal extension of the end point $p_2$ of an elongated piece 1 at a certain tilt angle can be calculated without using trigonometric functions.

The structure of acceleration sensors is known by artisans in the field to such an extent that it is not discussed in more detail in this context. As to the prior art, reference is made to U.S. Pat. No. 4,471,533. In any case, it must be noted that an acceleration sensor is based in its technical principle on measuring the forces acting on a piece moving in the gravitational field by an electric and/or mechanical principle.

The data on the position of the elongated piece can be transmitted from the computing unit 4 into the sight of the user, for example, a display, or, before the display in case of measuring total position data in a beam structure consisting of several elements, an adding unit 6 or the like, using, for example, a suitable analog transformer if necessary (cf. point 5 in the drawing).

I claim:

1. A method for determining a position of an elongated piece, wherein at least one sensor is placed in connection with the elongated piece for measuring acceleration forces in a vertical measuring plane, said at least one sensor being connected with a computing unit, wherein at least one calculation formula is used in connection with the computing unit, terms of said at least one calculation formula including information derived from a measuring signal produced by said at least one sensor to calculate the position of the elongated piece at least in relation to a horizontal level, wherein the elongated piece is a beam structure of a working machine which is arranged to be pivotable substantially in the vertical measuring plane around a point of articulation, and wherein in the beam structure two points are determined having a known distance, preferably constant, and wherein at least one of the two points is a point of articulation, said method comprising the steps of:

measuring by said at least one sensor acceleration forces active on the elongated piece; and providing to the computing unit a calculation formula $(P_i = K * m_s)$, wherein $P_i$=a desired projection of the distance between the two points in the vertical measuring plane, K=L/g, wherein L=the distance between the two points, g=gravitational acceleration, and $m_s$=the measuring signal of said at least one sensor in a quantity suitable for the computing unit, wherein a measuring direction of said at least one sensor is selected in at least one of the following ways: 1) substantially perpendicular to a direct line between the two points, wherein by using the measuring signal of said at least one sensor, a horizontal extension of the beam structure is provided by the calculation formula ($P_i$=K * $m_s$), and 2) substantially to merge with a longitudinal direction of the direct line between the two points, wherein by using the measuring signal of said at least one sensor, a height position of the beam structure is provided by the calculation formula ($P_i$=K * $m_s$).

2. The method according to claim 1, further comprising the step of selecting each of the two points on the elongated piece to be a point of articulation of the beam structure, wherein the distance between the two points is an operational length of the beam structure.

3. The method according to claim 1, further comprising the steps of arranging in the beam structure two acceleration sensors, and selecting the measuring direction of one of the two acceleration sensors as being substantially perpendicular to the longitudinal direction of the direct line between the two points, and the measuring direction of the other of the two acceleration sensors as being substantially parallel to the longitudinal direction of the direct line between the two points.

4. The method according to claim 1, further comprising the steps of placing said at least one acceleration sensor on each part of the beam structure, and providing in the computing unit an adding unit for combining a position data of said each part of the beam structure obtained from the measuring signal of said at least one acceleration sensor into a total position data of the beam structure.

5. In a heavy machinery of the kind which has an elongated piece used as a beam structure which is arranged to be substantially pivotable in a vertical plane around a point of articulation, a method of determining a position of said elongated piece, said method comprising the steps of:

selecting substantially along a line two points on said elongated piece, wherein one of said two points is located at said point of articulation;

obtaining a distance value between said two points;

dividing said distance value by a gravitational acceleration value and storing a resulting value in processing means;

placing an acceleration sensor on said elongated piece for measuring an acceleration force acting thereon;

receiving an acceleration force value representative of said acceleration force; and providing to said processing means said acceleration force value for multiplying thereof with said stored resulting value, thereby calculating a projection of said elongated piece in a direction of a plane, wherein said projection is selected in at least one of the following ways: 1) substantially along a horizontal plane of said heavy machinery, and 2) substantially along said vertical plane of said heavy machinery.

6. The method according to claim 5, wherein said acceleration sensor measures said acceleration force in a direction substantially parallel to said line between said two points, and wherein said projection is calculated as a vertical projection of said elongated piece in a direction of said vertical plane of said heavy machinery.

7. The method according to claim 5, wherein said acceleration sensor measures said acceleration force in a direction substantially perpendicular to said line between said two points, and wherein said projection is calculated as a horizontal projection of said elongated piece in a direction of a horizontal plane of said heavy machinery.

8. The method according to claim 5, further comprising the steps of:

placing an additional acceleration sensor on said elongated piece for measuring an additional acceleration force acting thereon in a perpendicular direction to said previously measured acceleration force;

receiving an additional acceleration force value representative of said additional acceleration force; and providing to said processing means said additional acceleration force value for multiplying thereof with said stored resulting value, thereby calculating an additional projection of said elongated piece in a perpendicular direction of a plane to said previously measured projection of said elongated piece.

9. The method according to claim 5, further comprising the steps of:

providing a plurality of acceleration sensors;

placing at least one of said acceleration sensors on each elongated piece forming said beam structure; and combining in adding means each projection of said each elongated piece to calculate a total projection position of said beam structure.

* * * * *